(12) United States Patent
Lal et al.

(10) Patent No.: US 9,208,354 B2
(45) Date of Patent: Dec. 8, 2015

(54) TECHNIQUES FOR SECURING USE OF ONE-TIME PASSWORDS

(71) Applicant: Intel Corporation, Santa Clara, CA (US)

(72) Inventors: Reshma Lal, Hillsboro, OR (US); Matthew E. Hoekstra, Forest Grove, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/797,915

(22) Filed: Mar. 12, 2013

(65) Prior Publication Data

US 2014/0282935 A1    Sep. 18, 2014

(51) Int. Cl.
*G06F 21/72*    (2013.01)

(52) U.S. Cl.
CPC ...................................... *G06F 21/72* (2013.01)

(58) Field of Classification Search
CPC ..... H04L 63/062; H04L 9/0861; H04L 9/085; G06F 21/72
See application file for complete search history.

(56) References Cited

U.S. PATENT DOCUMENTS

| | | | |
|---|---|---|---|
| 2005/0177749 A1* | 8/2005 | Ovadia | 713/201 |
| 2007/0130472 A1* | 6/2007 | Buer et al. | 713/182 |
| 2009/0165099 A1 | 6/2009 | Eldar et al. | |
| 2009/0328168 A1* | 12/2009 | Lee | 726/6 |
| 2010/0263029 A1 | 10/2010 | Tohmo et al. | |
| 2011/0099625 A1 | 4/2011 | Thom et al. | |
| 2012/0159184 A1* | 6/2012 | Johnson et al. | 713/189 |
| 2012/0198538 A1* | 8/2012 | Spring et al. | 726/9 |

OTHER PUBLICATIONS

International Search Report and Written Opinion received for PCT Patent Application No. PCT/US2014/018842, mailed Aug. 21, 2014, 9 pages.

\* cited by examiner

*Primary Examiner* — Andrew Nalven
*Assistant Examiner* — Mary Li
(74) *Attorney, Agent, or Firm* — Kacvinsky Daisak Bluni PLLC

(57) ABSTRACT

Various embodiments are generally directed to the provision and use of a secure enclave defined within a storage of a computing device by a processor element thereof to store executable instructions of an OTP component implementing logic to generate and use one-time passwords (OTPs) to enable access to services provided by another computing device. An apparatus includes a storage; a first processor element; and first logic to receive a one-time password (OTP) routine, store the OTP routine within a first secure enclave defined by the first processor element within the storage, obtain a measure of the contents of the first secure enclave with the OTP routine stored therein, transmit the first measure to a computing device, and receive an OTP seed. Other embodiments are described and claimed.

20 Claims, 9 Drawing Sheets

TECHNIQUES FOR SECURING USE OF ONE-TIME PASSWORDS

TECHNICAL FIELD

Embodiments described herein generally relate to the use of a secure enclave defined within a storage of a computing device for securely decrypting and using a one-time password.

BACKGROUND

Although passwords have long been used as a tool for providing security in controlling access to computing devices and data/functions provided by remotely located computing devices, concerns have long existed concerning the use of "static" passwords that remain unchanged and are used repeatedly over an extended period of time. It has long been recognized that one-time passwords (OTPs) are, by their one-use nature, more secure. However, there have long been challenges regarding how to generate and provide them.

A longstanding solution has been to provide miniature OTP generator devices that authorized users could carry with them. Such devices often come in the shape and size of credit cards or key fobs, and feature a small alphanumeric display that shows a frequently changing OTP. The OTPs are generated by such devices using any of a variety of algorithms that often require an initial "seed" value and a constantly changing "variable" value such as the time of day or the current output of a monotonic counter. The computing device to which the generated OTPs are meant to enable access also execute the same algorithm with the same seed and variable values. As a result, the miniature OTP generator device and the computing device to which access is sought should generate identical OTPs over time, though maybe with a slight drift in their relative timings over a period of months to years.

Although the provision of such miniature OTP generator devices is effective, and are in wide use among those who work with sensitive information, the fact of needing to have a physical device in one's possession to have an OTP when needed is inconvenient. Further, users of such devices can find themselves unable to make use of services of a computing device if a miniature OTP generator device becomes damaged, is lost or simply isn't in their possession when needed. One proposed solution to this is to incorporate OTP generation functionality into personally owned computing devices of individuals, including handheld portable ones, that they are more likely to have with them on a frequent basis for a myriad of uses. Unfortunately, concerns exist over the frequently weak level of security of those personally owned computing devices such that the seed and/or variable values may be compromised. It is with respect to these and other considerations that the embodiments described herein are needed.

DETAILED DESCRIPTION

Figure 1:
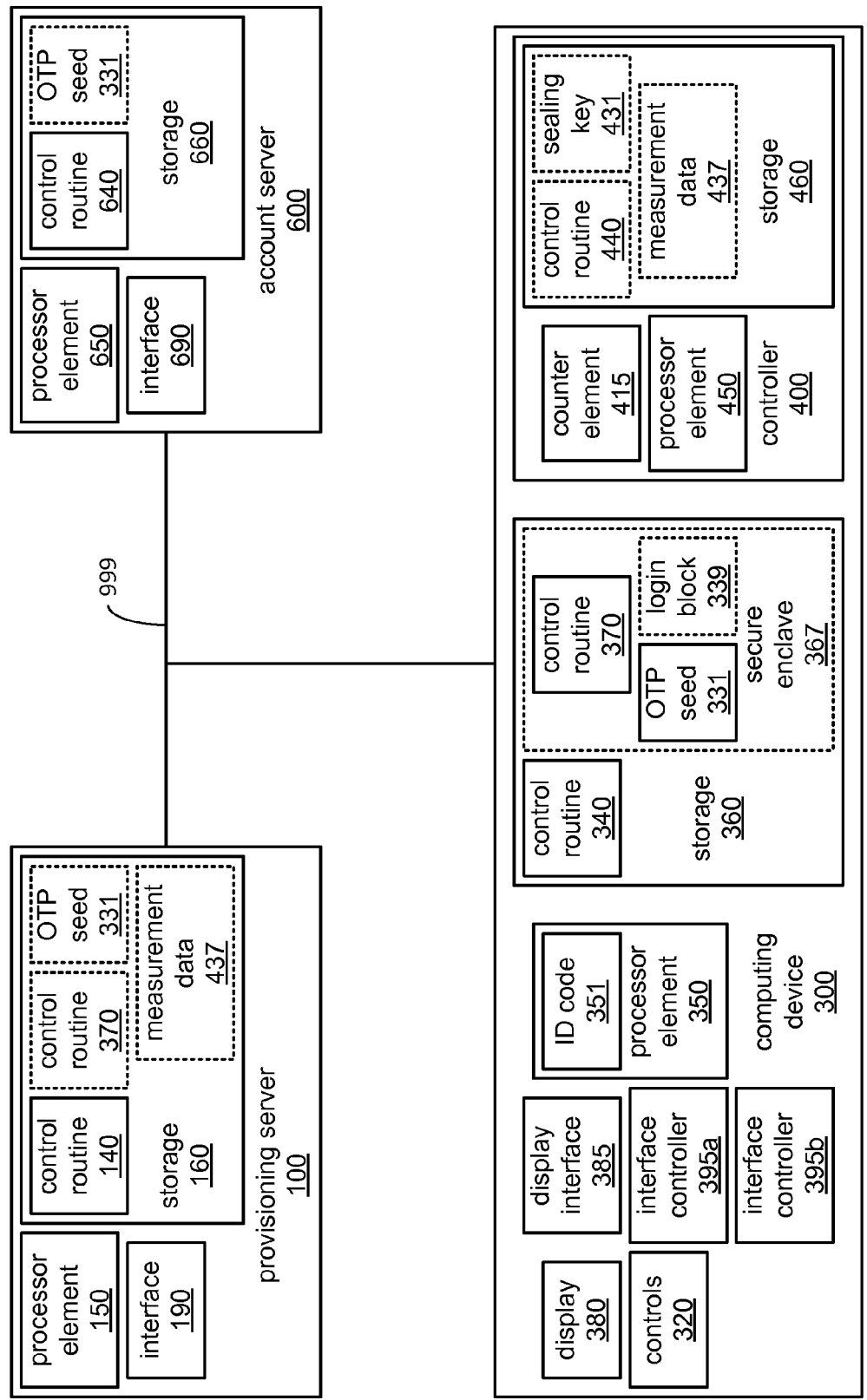
FIG. 1 illustrates a first embodiment of interaction among computing devices.

Various embodiments are generally directed to the provision and use of a secure enclave defined within a storage of a computing device by a processor element thereof to store executable instructions of an OTP component implementing logic to generate and use one-time passwords (OTPs) to enable access to services provided by another computing device. The secure enclave occupies at least one range of addressable locations within the storage that is created by the processor element through use of specific instructions of its instruction set. In various implementations, access by software not stored within the secure enclave may be impermissible, highly restricted in nature and/or require decryption.

The computing device is initially provisioned with the OTP component to generate and use OTPs through communication with a provisioning server in which aspects of the integrity and/or security features of the computing device are tested to ensure a degree of trustworthiness. Further, an initial passcode provided to an operator of the computing device by an entirely different mechanism (e.g., by letter through a postal service, by telephone call, in person, etc.) is used in the initial access to the provisioning server. Assuming successful completion of testing, the seed value is provided by the provisioning server to the computing device. The computing device is then caused to perform additional steps in which the seed value is re-encrypted with a sealing key generated within the computing device for later use by the OTP component.

Following such provisioning, the computing device is caused to re-instantiate the secure enclave each time an OTP is required for access to an account server providing any of a variety of services to which an operator of the computing device seeks access. Following re-instantiation of the secure enclave, the OTP component and the re-encrypted seed value are stored therein, and the OTP component is executed by a processor element of the computing device therein. Also, a check is made of the integrity of what is stored within the secure enclave in a manner that entails generation of a key for decrypting the re-encrypted seed value. If the integrity of at least the OTP component has not been lost, then the generated key should be operative to decrypt the seed value.

In support of these various tests and in maintaining the integrity of communications between the computing device and each of the provisioning and account servers, the computing device may incorporate various additional features to prevent capture login-related input of an operator and/or screen captures of login-related visual information presented to the operator. More specifically, secure pathways for login-related information may be defined with hardware and/or software components to prevent compromise.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 depicts a block diagram of interactions among computing devices of a computing services system 1000 comprising one or more of a provisioning server 100 to provide OTP components, a computing device 300 to be provisioned with and to use the OTP components, and an account server 600 providing services to which access is sought using the computing device 300 with the OTP components. Each of these computing devices 100, 300 and 600 may be any of a variety of types of computing device, including without limitation, a desktop computer system, a data entry terminal, a laptop computer, a netbook computer, an ultrabook computer, a tablet computer, a handheld personal data assistant, a smartphone, a digital camera, a mobile device, a body-worn computing device incorporated into clothing, a computing device integrated into a vehicle, a server, a cluster of servers, a server farm, etc.

As depicted, these computing devices 100, 300 and 600 exchange signals conveying executable instructions and data associated with the use of OTPs to gain access to services through a network 999 of the system 1000. However, one or more of these computing devices may exchange other data entirely unrelated to OTPs or their use. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

It should be noted that despite the specific depiction of only one each of a provisioning server 100, a computing device 300 and an account server 600, it is to be understood that embodiments are possible that include numerous ones of each of these computing devices. By way of example, it is envisioned that a single one of either of the provisioning server 100 or the account server 600 may support a great many ones of the computing device 300. Also by way of example, it is envisioned that one of the computing device 300 may be provisioned with multiple versions of OTP components, possibly provided by multiples ones of the provisioning server 100 to enable access to multiple different services provided by multiple ones of the account servers 300. Further, it should be noted that despite the depiction of separate servers to support provisioning and use of OTP components, embodiments are possible in which a single server may incorporate and/or support both functions. Thus, the specific depiction of a single one of each of these computing devices and of a particular separation of functions among two servers, such specific depiction is but an example to facilitate discussion and should not be taken as limiting.

In various embodiments, the provisioning server 100 incorporates one or more of a processor element 150, a storage 160, and an interface 190 to couple the provisioning server 100 to the network 999. The storage 160 stores a control routine 140, an OTP seed 331 and a control routine 370. The control routine 140 incorporates a sequence of instructions operative on the processor element 150 to implement logic to perform various functions. In executing a sequence of instructions of the control routine 140, the processor element 150 is caused to operate the interface 190 to first transmit the control routine 370 to the computing device 300. With the computing device 300 so provisioned with the control routine 370, the processor element 150 is then caused to await receipt of the measurement data 437 derived within the computing device 300 from measured parameters of a secure enclave into which the control routine 370 is stored, as will be described in greater detail. The processor element 150 is then caused to analyze the measurement data 437 to determine whether the computing device 300 incorporates a selected minimum combination of security features including support for appropriate security enclaves, and to determine whether the control routine 370 was successfully received by and stored unmodified within such a secure enclave with the computing device 300. Presuming that the processor element 150 determines that the computing device 300 does incorporate such features and that the control routine 370 has been so stored, the processor element 150 is then caused to transmit the OTP seed 331 to the computing device 300 for use with the control routine 370.

In various embodiments, the computing device 300 incorporates one or more of a processor element 350 (acting as a main processor of the computing device 300), a storage 360, a display 380 and a display interface 385 coupled thereto, controls 320 and an interface controller 395a coupled thereto, a controller 400, and an interface controller 395b to couple the computing device 300 to the network 999. The processor element 350 incorporates an ID code 351 and defines a secure enclave 367 within the storage 360. The storage 360 stores the control routine 370, a login block 339 and the OTP seed 331 within the secure enclave 367. However, a control routine 340 is stored within the storage 360 outside the secure enclave 367. The controller 400 incorporates one or more of a processor element 450 (acting as a controller processor of the controller 400 of the computing device 300), a storage 460 and a counter element 415. The storage 460 stores a control routine 440, a sealing key 431 and the measurement data 437.

The controls 320 and the display 380 provide a user interface for an operator of the computing device 300. The controls 320 may be any of a variety of types of manually-operable control including and not limited to one or more of a keyboard, mouse, keypad, touchpad, stylus, fingerprint reader, etc. The display 380 may be any of a variety of types of display device including and not limited to a liquid crystal display (LCD), an electroluminescent (EL) display, a plasma display, etc. Further, it should be noted that the controls 320 and the display 380 may be combined into a single component such as a touchscreen display. The controls 320 are able to be recurringly monitored through the interface controller 395a. The display 380 is able to be caused to visually present various forms of content through operation of the display interface 385. As will be explained in greater detail, information conveyed between the computing device 300 and its operator may be protected from unauthorized access (e.g., snooping, keystroke monitoring, image buffer capturing, etc.) through the use of one or both of an alternate pathway for the movement of such information through the controller 400 and the use of encryption in exchanges of such information with executable code stored within a secure enclave (e.g., the secure enclave 367).

Similar security measures may be employed for the exchange of data with other computing devices (e.g., the provisioning server 100 and/or the account server 600) across the network 999 through the interface controller 395b. Specifically, as with each of the interface controller 395a and the display interface 385, an alternate pathway for the movement of such data through the controller 400 and/or encryption in exchanges of such data with executable code stored within a secure enclave (e.g., the secure enclave 367) may be employed.

The secure enclave 367 may be made up of one or more ranges of addresses defined by the processor element 350 as subject to relatively tight access restrictions. Such restrictions may include the ability of executable instructions stored within the secure enclave 367 (e.g., the control routine 370) being granted the ability to access data and/or executable instructions relatively freely at other addresses throughout the storage 360, while accesses by other executable instructions from outside the secure enclave 367 (e.g., the control routine 340) may be greatly limited, or not permitted at all. Indeed, executable instructions and/or data stored within the secure enclave 367 may be encrypted to further protect them from attempted accesses by executable instructions from outside the secure enclave 367. Alternatively or additionally, executable instructions stored within the secure enclave 367 may be granted the ability to access a relatively wide selection of components of the computing device 300 at various address locations, while accesses by other executable instructions outside the secure enclave 367 may be to a relatively limited selection of components. As will be explained in greater detail, the instruction set of the processor element 350 includes instructions to support the instantiation of one or more secure enclaves by executable instructions seeking to define a portion of the storage 360 in which data may be stored and executable instructions may be executed securely.

The processor element 450 and the storage 460 define portions of an operating environment within the controller 400 that is substantially separate from the operating environment defined by at least the processor element 350 and the storage 360. This separate operating environment enables the control routine 440 to be executed with a greatly reduced risk of being compromised by other less trustworthy software that may be executed by the processor element 350. The storage of data within the storage 460 further aids in ensuring the integrity of the execution of the control routine 440. Thus, the controller environment seeks to do with separate hardware what is done with the instantiation of the secure enclave 367, namely provide a secure environment in which particular instructions may be executed.

The counter element 415 provides a hardware-based counting function from within the controller 400 that is intended to be relied upon as a trustworthy source of variable values output by a secure counting device. In some embodiments, the counter element 415 includes a hardware-based clock that maintains time in one or more time zones, or possibly a time base such as Greenwich Mean Time (GMT) or coordinated universal time (UTC). In other embodiments, the counter element 415 includes a monotonic counter that it progresses (either decrements or increments) at a uniform rate without ever running backwards, and having a large enough bit width so as not to reach the limit of its count for many years or decades into the future.

The control routine 340 incorporates a sequence of instructions operative on the processor element 350 in its role as a main processor element of the computing device 300 to implement logic to perform various functions. In executing a sequence of instructions of the control routine 340, the processor element 350 is caused to enable an operator of the computing device 300 to interact with the controls 320 and the display 380 to cause the computing device 300 to access the provisioning server 100 to effect provisioning of the computing device 300 with one or more OTP components. This may occur as part of any of variety of usage scenarios involving desired use of the computing device 300 with services provided by the account server 600 in which access to those services requires logging into an account. Such possible usage scenarios include and are not limited to the operator being a customer of a financial institution that maintains the account server 600 with which the operator wishes to engage in online banking, the operator being a medical professional in need of accessing medical records for one of their patients at a hospital that maintains the account server 600, etc.

Upon accessing the provisioning server 100, the provisioning server 100 may visually present the operator various prompts for downloading the control routine 370 from the provisioning server 100 via the display 380. Upon acting on those prompts, the provisioning server 100 transmits the control routine 370 to the computing device 300. Upon receipt the control routine 370, it is stored within the storage 360, though not necessarily directly into the secure enclave 367. The provisioning server 100 may interact with the control routine 340 to prompt the operator to approve execution of the control routine 370 to install it. In some embodiments, the control routine 340 may be a web browser or other form of software to support communications with other computing devices, and the control routine 370 may be a "plug-in" or other form of "add-on" software to augment the capabilities of the control routine 340.

The control routine 370 also incorporates a sequence of instructions operative on the processor element 350 to implement logic to perform various functions. Regardless of the exact nature of interaction between the control routines 340 and 370, execution of the control routine 370 by the processor element 350 causes the processor element 350 to instantiate the secure enclave 367 and store at least a copy of the control routine 370 therein. From then onward, the processor element 350 executes the instructions of the control routine 370 within the secure enclave 367 where such execution now takes place in a secure environment with minimal risk of the control routine 370 being compromised in being executed. Upon such execution, at least the control routine 370 causes the processor element 350 to cooperate with the provisioning server 100 to establish secure communications between the provisioning server 100 and the secure enclave 367 such that the control routine 370 is able to exchange data securely with the provisioning server 100 from within the secure enclave 367. With such secure communications established, the processor element 350 is further caused to cooperate with the provisioning server 100 to present a prompt to the operator of the computing device 300 to provide an initial passcode received by the operator via a communications route different from the network 999, such as by postal service, by telephone, in person, etc.

In this presentation of a prompt for entry of the passcode, in some embodiments, the display interface 385 is capable of engaging in encrypted communications with the secure enclave 367. As a result, text and/or graphical imagery of a visual prompt to enter the passcode received from the provisioning server 100 by the control routine 370 within the secure enclave 367 is able to be relayed by the control routine 370 to the display interface 385 for presentation on the display 380 in encrypted form such that it cannot be monitored, copied, or otherwise manipulated by what may be malicious software residing within the computing device 300 in a location outside of the secure enclave 367. Further, the image buffer of the display interface 385 may be configured to be inaccessible at least by software stored and executed outside of the secure enclave 367 and/or configured to be accessible only in its encrypted form. In other embodiments, the display controller 385 may be linked to the controller 400 in a manner that enables the processor element 450 to relay text and/or graphical imagery of such a visual prompt from the secure enclave 367 and to the display controller 385.

Similarly, in some embodiments, the interface controller 395a is capable of engaging in encrypted communications with the secure enclave 367 such that data entered by the operator via the controls 320 (e.g., the actual passcode) cannot be monitored, copied, or otherwise manipulated by what may be malicious software (e.g., a keystroke logger) residing within the computing device 300 in a location outside of the secure enclave 367. In other embodiments, the interface controller 395a may be linked to the controller 400 in a manner that enables the processor element 450 to relay data entered by the operator to the secure enclave 367 such that only the control routine 370 in the operating environment of the processor element 350 has access to it.

Such security in the conveying of text and/or graphical imagery to the display controller 385 and/or such security in the conveying of data entered by an operator from the interface controller 395a may be invocable in some embodiments by the operator (perhaps through a specific combination of keyboard keys) or in other embodiments by executable instructions of the control routine 370. However such security is invoked, and regardless of the exact manner in which the operator's entry of the passcode is securely provided to the control routine 370 within the secure enclave 367, the control routine 370 transmits the passcode to the provisioning server 100. The transmission of the passcode to the provisioning server 100 verifies the operator of the computing device 300 as a person authorized to make use of services of the account server 600.

The control routine 440 incorporates a sequence of instructions operative on the processor element 450 in its role as a controller processor of the controller 400 to implement logic to perform various functions. In addition to causing the provisioning server 100 to be provided with the passcode given by another channel to the operator, the control routine 370 also causes the processor element 350 to cooperate with the processor element 450 executing the control routine 440 to derive the measurement data 437 from the contents of the secure enclave 367 for transmission to the provisioning server 100. More specifically, the processor element 450 is able to access the contents of the secure enclave 367 to arithmetically derive the measurement data 437 therefrom (e.g., a hash or cyclic redundancy check value), and is signaled to do so by the processor element 350. Upon creating the measurement data 437, the processor element 450 provides it to the processor element 350, and the processor element 350 is caused by the control routine 370 to transmit it to the provisioning server 100.

Upon receiving the measurement data 437, the provisioning server 100 examines it to determine whether it is as expected. The formation of the measurement data 437 from the contents of the secure enclave with the control routine 370 residing therein is meant to provide proof to the provisioning server 100 that the computing device 300 possesses the ability to form secure enclaves, and that the computing device 300 did in fact do so and placed the control routine 370 in uncorrupted form within it. Thus, the measurement data 437 provides evidence to the provisioning server 100 that the computing device 300 has at least a baseline set of security features that enables the computing device 300 to be deemed a sufficiently trustworthy platform to fully provision for generating OTPs.

Presuming that the measurement data 437 does pass whatever tests that the provisioning server 100 performs on it, the provisioning server 100 transmits the OTP seed 331 to the computing device 300. Depending on the particular OTP generation algorithm scheme used for access to the account server 600, it is likely that the OTP seed 331 is unique for each computing device that the provisioning server 100 provides one to, even where multiple computing devices may be associated with a single operator. Upon receiving the OTP seed 331 through the secure communications earlier established between the provisioning server 100 and the secure enclave 367, the OTP seed 331 is decrypted from its transmitted encryption and stored within the secure enclave 367. The processor element 350 is then caused to signal the processor element 450 to derive the sealing key 431 from at least the measurement data 437.

Any of a variety of arithmetic algorithms may be employed to derive the sealing key 431 from the measurement data 437. Further, one or more ID codes (e.g., the ID code 351 of the processor element 350) and/or the initial passcode used in verifying the operator to the provisioning server 100 may be incorporated into the creation of the sealing key 431, making use of the sealing key 431 specific to the computing device 300 as will be explained in greater detail. With the sealing key so derived, the processor element 450 provides it to the processor element 350, which is caused by the control routine 370 to re-encrypt the OTP seed 331 using the sealing key 431. Following this re-encrypting of the OTP seed 331, the provisioning of the computing device 300 to generate OTPs for use in accessing the account server 600 is complete. Secure communications between the control routine 370 and the provisioning server 100 are stopped. The control routine 370 and the OTP seed 331 are stored elsewhere within the storage 360 (or elsewhere within the computing device 300), and the secure enclave 367 is uninstantiated. It is important to note that the sealing key 431 is discarded and not stored anywhere within the computing device 300 or elsewhere.

At a later time following the provisioning of the above computing device 300, execution of the control routine 340 by the processor element 350 enables the operator of the computing device 300 to interact with the controls 320 and the display 380 to use the computing device 300 to access the account server 600. Upon accessing the account server 600, the account server 600 may cooperate with the control routine 340 to visually present the operator various prompts for providing the account server 600 at least an OTP, and possibly some other form of security "challenge" as a second security factor (e.g., a separate typed password, a fingerprint scan, etc.). Execution of the control routine 370 is also triggered, either by the account server 600 through the control routine 340 or by the operator, to generate the requested OTP.

Upon execution of the control routine 370 by the processor element 350, the processor element 350 is caused to again instantiate the secure enclave 367 and to store a copy of at least the control routine 370 therein. From then onward, the processor element 350 again executes the instructions of the control routine 370 within the secure enclave 367 where such execution now takes place in a secure environment with minimal risk of the control routine 370 being compromised in being executed. Again, such security as has been described for conveying text and/or graphical imagery to the display controller 385 from the secure enclave 367 and/or for conveying data entered by the operator from the interface controller 395a to the secure enclave 367 may be invoked by the operator or via executable instructions of the control routine 370. With the invocation of such security, prompts to present a security challenge to the operator and the operator's response thereto (e.g., typed entry of a password, provision of a scan of a fingerprint, etc.) are secured against being monitored or copied by malicious software that may reside within the storage 360 at a location outside of the secure enclave 367.

Upon execution of the control routine 370 within the secure enclave 367, the processor element 350 signals the processor element 450 to again derive the measurement data 437 of the contents of the secure enclave 367 and to again additionally derive the sealing key 431 from the measurement therein. In essence, the processor element 450 is signaled to recreate the sealing key 431 anew. Upon doing so, the processor element 450 provides the recreated sealing key 431 to the processor element 350. With the measurement taken of the secure enclave with the control routine 370 (which is the same configuration of what was stored within the secure enclave 367 when a measurement was taken during provisioning), the processor element 350 is caused to first store a copy of the encrypted seed data 331 within the secure enclave 367 and then use the recreated sealing key 431 to decrypt the seed data 331 for use in generating an OTP. Presuming that neither of the control routine 370 or the structure of the secure enclave 367 have been altered or otherwise corrupted, the recreated sealing key 431 should be identical to the originally created sealing key 431 used to encrypt the seed data 331 during provisioning as previously described. Thus, the control routine 370 should be able to use the recreated sealing key to decrypt the OTP seed 331, thereby providing the control routine 370 with a seed value for use in generating an OTP.

The processor element 350 is also caused by the control routine 370 to request a variable value from the controller 400. As previously discussed, both a seed value (conveyed within the OTP seed 331) and a variable value (a value that changes with the passage of time) are needed to create an OTP. Upon receiving the request from the processor element 350 for a variable value, the processor element 450 is caused by the control routine 440 to retrieve the current variable value from the counter element 415 and provide it to the processor element 350. Upon receipt of the variable value from the processor element 450, the processor element 350 is caused by the control routine 370 to use that variable value and the seed value of the just-decrypted OTP seed 331 to generate an OTP.

In some embodiments, the control routine 370 may simply cause the processor element 350 to transmit the generated OTP to the account server 600 to enable access to its services. However, in other embodiments, the processor element 350 may be caused to create a login block 339 in which the OTP and whatever input that the operator provides in response to a challenge prompt are combined for transmission to the account server 600. Still other pieces of data may be incorporated into the login block 339, such as the ID code 351 of the processor element 350 or the passcode originally provided to the operator for use with the provisioning server 100. Presuming that the sealing key 431 was successfully recreated such that the generated OTP is correct, the provision of the OTP to the account server 600, either alone or combined with other pieces of information, should cause the account server 600 to grant the operator of the computing device 300 access to services that it provides.

In various embodiments, the account server 600 incorporates one or more of a processor element 650, a storage 660, and an interface 690 to couple the account server 600 to the network 999. The storage 660 stores a control routine 640 and a copy of the OTP seed 331. The control routine 640 incorporates a sequence of instructions operative on the processor element 650 to implement logic to perform various functions. In executing a sequence of instructions of the control routine 640, the processor element 650 is caused to operate the interface 690 to interact with the computing device 300 to receive and verify at least the OTP generated and transmitted by the computing device 300, as just described. At an earlier time, the account server 600 receives the copy of the OTP seed 331 from the provisioning server 100. In response to receiving the OTP generated by the computing device 300, the processor element 650 is caused to independently use the OTP seed 331 and its counterpart to the counter element 415 of the computing device 300 to generate an OTP, and to then determine whether its generated OTP and the OTP received from the computing device 300 match. Presuming that they are a match, the processor element 650 is caused to grant access to services of the account server 650 to the computing device 300.

In various embodiments, each of the processor elements 150, 350, 450 and 650 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked.

In various embodiments, each of the storages 160, 360, 460 and 660 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 395b and 690 may employ any of a wide variety of signaling technologies enabling each of computing devices 300 and 600 to be coupled through the network 999 as has been described. Each of these interfaces includes circuitry providing at least some of the requisite functionality to enable such coupling. However, each of these interfaces may also be at least partially implemented with sequences of instructions executed by corresponding ones of the processor elements 150, 350, 450 and 650 (e.g., to implement a protocol stack or other features). Where one or more portions of the network 999 employs electrically and/or optically conductive cabling, corresponding ones of these interfaces may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, corresponding ones of these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1 xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although each of these interfaces are depicted as a single block, one or more of these may include multiple interfaces that may be based on differing signaling technologies. This may be the case especially where one or more of these interfaces couples corresponding ones of these computing devices to more than one network, each employing differing communications technologies.

Figure 2:
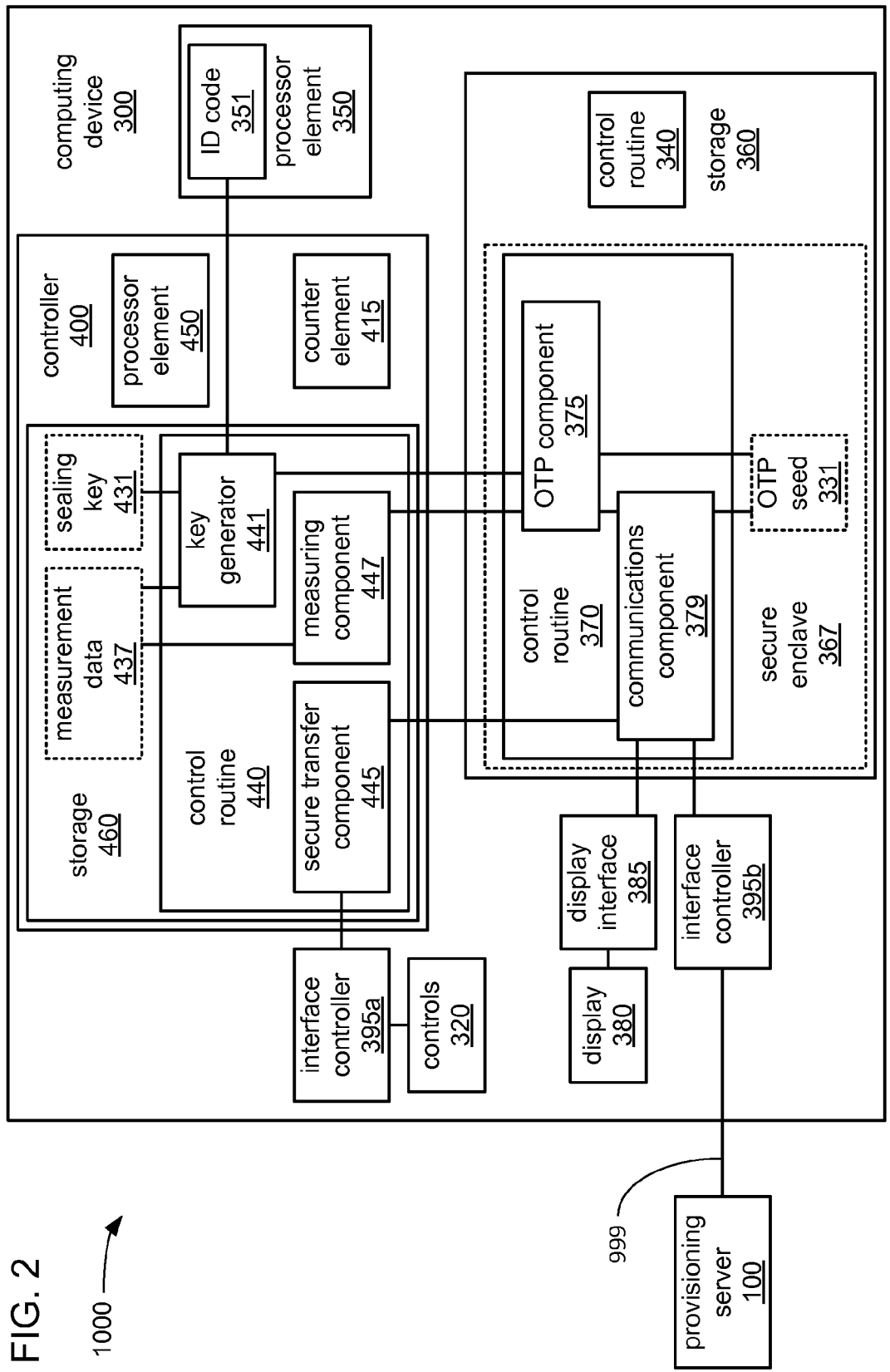
FIGS. 2 and 3 each illustrate a portion of the embodiment of FIG. 1.
Figure 3:
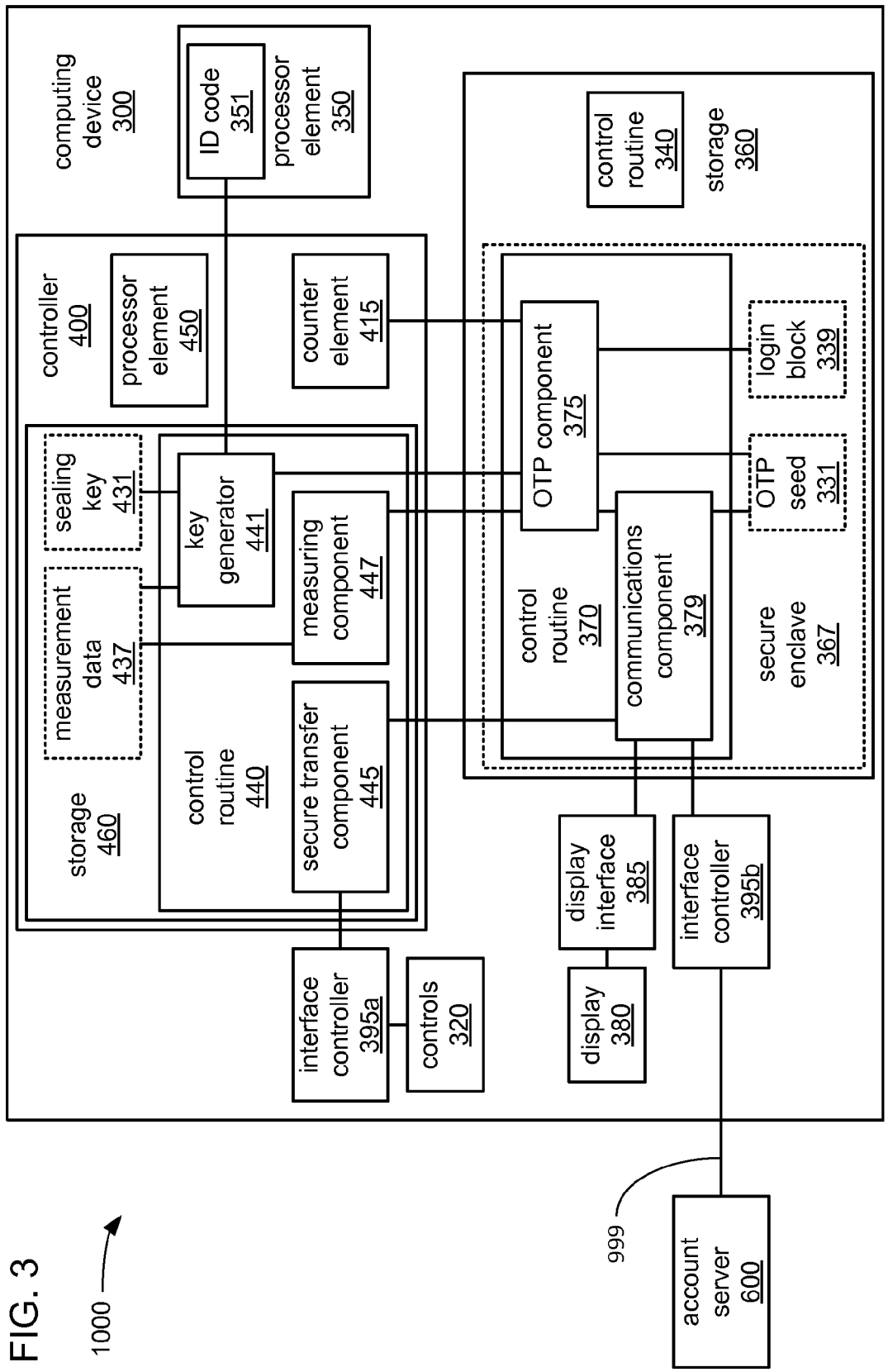

FIGS. 2 and 3, taken together, illustrate block diagrams of a portion of the block diagram of FIG. 1 in greater detail. More specifically, aspects of the operating environments of the computing device 300 and the controller 400 are depicted during provisioning to enable generating OTPs in FIG. 2, and during generation of an OTP in FIG. 3, in which the processor elements 350 and 450 are caused by execution of corresponding ones of the control routines 340, 370 and 440 to perform the aforedescribed functions. As will be recognized by those skilled in the art, each of these control routines, including the components of which each is composed, is selected to be operative on whatever type of processor or processors that are selected to implement corresponding ones of each of these processor elements.

In various embodiments, each of the control routines 340, 370 and 440 may include a combination of an operating system, device drivers and/or application-level routines (e.g., so-called "software suites" provided on disc media, "applets" obtained from a remote server, etc.). Where an operating system is included, the operating system may be any of a variety of available operating systems, including without limitation, Windows™, OS X™, Linux®, or Android OS™. Where one or more device drivers are included, those device drivers may provide support for any of a variety of other components, whether hardware or software components, of the computing device 300 and the controller 400.

As depicted, the control routine 370 incorporates at least an OTP component 375 and a communications component 379. The OTP component 375 is executable by the processor element 350 to coordinate action between the processor elements 350 and 450 in creating the measurement data 437 and the sealing key 431, as well as using the seed value of the OTP seed 331 and the variable value provided by the counter element 415 to generate OTPs. The communication component 379 is executable by the processor element 350 to assist in creating secure communications between the control routine 370 within the secure enclave 367 and one or more of the provisioning server 100, the account server 600, the interface controller 395a and the display interface 385.

As depicted, the control routine 440 incorporates at least a secure transfer component 445, a key generator 441 and a measuring component 447. The secure transfer component 445 is executable by the processor element 440 to securely convey data among one or more secure enclaves (e.g., the secure enclave 367) and one or both of the interface controller 395a and the display interface 385. The measuring component 447 is executable by the processor element 440 to derive a measure of the contents of a secure enclave (e.g., the secure enclave 367) by any of a variety of arithmetic algorithms as part of verifying the integrity of code and/or executable instructions within a secure enclave. The key generator component 441 is executable by the processor element 440 to generate a key from the measure derived by the measuring component of the contents of a secure enclave (e.g., the sealing key 431 from the measurement data 437 storing a measure of the contents of the secure enclave 367).

Turning to FIG. 2 regarding provisioning, the communications component 379 cooperates with the provisioning server 100 to establish secure communications therebetween through the network 999 and the interface controller 395b. The communications component 379 then receives the various visual prompts to be presented on the display 380 from the provisioning server 100, and transmits the passcode entered by the operator to the provisioning server 100 in response to such prompting. The communications component 379 also receives the OTP seed 331 in its originally encrypted form from the provisioning server 100. In some embodiments, the communications component 379 may also establish secure communications with one or both the interface controller 395a and the display interface 385 to engage in encrypted exchanges of the prompts to be presented on the display 380 and/or the passcode provided by the operator via the controls 320.

The OTP component 375 signals the processor element 450 of the controller 400 to provide the measurement data 437 derived from a measure of the contents of the secure enclave 367 and the sealing key 431 derived from at least the measurement data 437. Following receipt of the OTP seed 331, the OTP component 375 then uses the sealing key 431 to encrypt the OTP seed 331 for future use in generating OTPs as has been described.

The secure transfer component 445 provides another mechanism by which secure communications may occur between the control routine 370 and one or both of the display interface 385 and the interface controller 395a. In various embodiments, the transfer component 445 may do this either in addition to or lieu of the communications component 379 establishing secure communications with one or both of the display interface 385 and the interface controller 395a. In essence, the transfer component 445 provides an alternate route by which secure exchanges of visual prompts to be presented to the operator on the display 380 and the passcode provided by the operator via the controls 320 may be exchanged in a manner that prevents interception or modification by malicious software that may reside within the storage 360 outside of the secure enclave 367.

The measuring component 447 derives the measurement data 437 made up of a measure of the contents of the secure enclave 367 before the inclusion of the OTP seed 331 therein. The key generator 441 generates the sealing key 431 from at least the measurement data 437. The key generator 441 may also include one or more identifying pieces of data of the computing device 300, such as the ID code 351 of the processor element 350, in the generation of the sealing key 431. By including such an identifying piece of data unique to the computing device 300, later generation of the sealing key 431 for subsequent decrypting of the OTP seed 331 is effectively "bound" to the computing device 300 such that it must occur on the computing device 300 where that identifying piece of data is available for a correct sealing key to be created.

Turning to FIG. 3 regarding generation of an OTP, the communications component 379 cooperates with the account server 600 to establish secure communications therebetween through the network 999 and the interface controller 395b. The communications component 379 then receives the various visual prompts to be presented on the display 380 from the account server 600, and transmits at least the generated OTP to the account server 600. As was the case during provisioning (as just discussed in reference to FIG. 2), one or both of the communications component 379 and the secure transfer component 445 enable the secure exchange of data between the secure enclave 367 and each of the display interface 385 and the interface controller 395a. In different embodiments, one or both of these may be used.

The OTP component 375 signals the processor element 450 of the controller 400 to provide the sealing key 431 anew based on a measure of the contents of the secure enclave 367 as instantiated again for purposes of generating an OTP to provide to the account server 600. The OTP component 375 also signals the processor element 450 to provide a current variable value from the counter element 415. The OTP component then uses the recreated sealing key 431 to decrypt the OTP seed 331 to obtain its seed value, and then uses both that seed value and the variable value generated by the counter element 415 to generate an OTP. The OTP component may then either provide the generated OTP to the communications component 379 for transmission to the account server 600, or may generate the login block 339 in which the generated OTP is combined with one or more other items (e.g., a typed password or fingerprint scan of the operator via the controls 320) for transmission to the account server 600.

The measuring component 447 again derives a measure of the contents of the secure enclave 367 with the OTP component 375 included within the secure enclave 367, but not the OTP seed 331. This is done to match the contents of the secure enclave 367 during provisioning, where the secure enclave 367 included the OTP component 375, but not the OTP seed 331, since the OTP seed 331 had not yet been received at that point during provisioning. It is necessary to have the same contents within the secure enclave 367 each time a measure of its contents is taken so that the derived measurement data 437 that results from such measuring will be the same each time. The key generator 441 again generates the sealing key 431 from the same combination of the measurement data 437 derived by the measuring component 447 from the contents of the secure enclave 367 and whatever other items were included (e.g., identifying data such as the ID code 351) when the sealing key 431 was originally generated during provisioning. Following derivation of the measurement data 437, a copy of the OTP seed 331 is then stored in the secure enclave 367 to enable its decryption under secure conditions. Presuming that nothing has been altered in the structure of the secure enclave 367 as now re-instantiated for generating an OTP, and presuming that none of the other items as may be included in generating the sealing key 431 have since changed, the sealing key 431 as now recreated for use in decrypting the OTP seed 331 to enable generation of an OTP should be identical to the sealing key 431 as originally generated during provisioning to encrypt the OTP seed 331.

Figure 4:
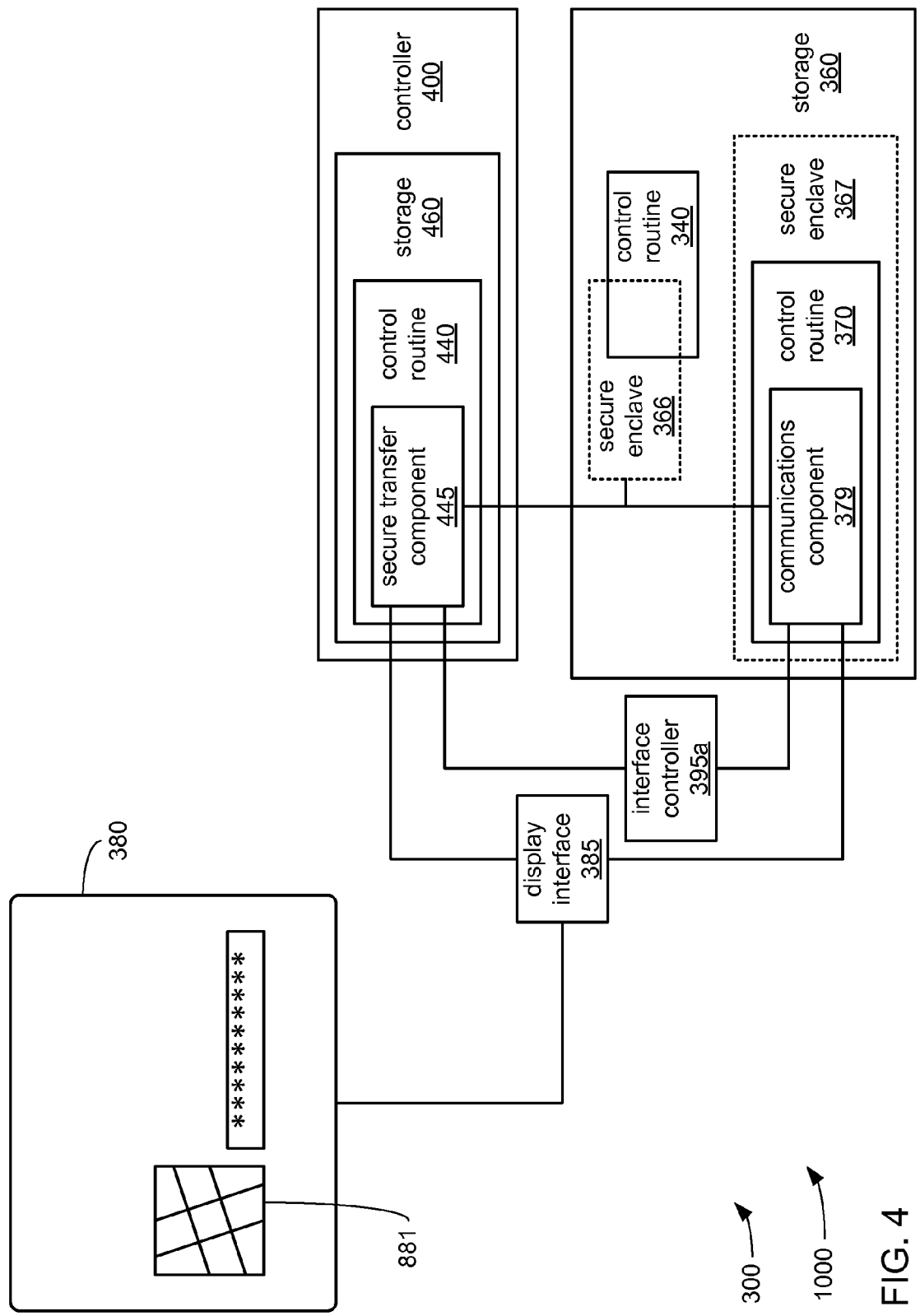
FIG. 4 illustrates a variant of the portion of FIGS. 2 and 3.

FIG. 4 illustrates variations of the manner in which security may be provided in interactions between components. Specifically, aspects of securing exchanges of data among the secure transfer component 445, the communications component 379, the display interface 385 and the interface controller 395a are depicted.

As depicted, another secure enclave 366 may be defined within the storage 360 by the processor element 350 in some embodiments. This additional secure enclave 366 may store a portion of the control routine 340 to provide security services, including instantiating and uninstantiating secure enclaves, and providing an interface for communications with (or through) the controller 400 as a hardware abstraction layer. Further, although the control routine 440 has been discussed as being stored and executed within the entirely separate operating environment of the controller 400, in alternate embodiments, one or more of the functions performed by the control routine 440 may be performed by the portion of the control routine 340 that reside in the additional secure enclave 366. Further, a variant of the counter element 415 implemented as instructions executable by the processor element 350 may also be stored and executed within the additional secure enclave 366. Stated differently, the additional secure enclave 366 may be included in various embodiments to provide support other secure enclaves (e.g., the secure enclave 367) and/or may be included in lieu of the separate environment of the controller 400.

As has been discussed, passcodes, passwords, fingerprint scans and/or other input received through operator operation of the controls 320 (FIGS. 1-3) may be securely conveyed from the interface controller 395a to the communications component 379 using encryption to prevent interception or tampering, or may be securely conveyed to the secure enclave 366 through the controller 400 with the assistance of the secure transfer component 445. As has also been discussed, text and/or images related to logins may be securely conveyed to the display interface 385 either by the communications component 379 using encryption to prevent interception or tampering, or through the controller 400 with the assistance of the secure transfer component 445. In alternate embodiments, the routing of such data through the controller 400 may include routing them through the additional secure enclave 366 where the secure enclave 366 provides an interface for other secure enclaves to the controller 400 for such secure routing.

FIG. 4 additionally depicts an example of the visual presentation of an image 881 related to logging into one or the other of the provisioning server 100 and the account server 600. As will be familiar to those skilled in the art, a server to which access is sought may transmit a image selected to be associated with a particular account of a particular operator to provide a visual indication to the operator that they are in communication with that server to which they seek access (or a proxy thereof), and not a computing device masquerading as that server. Such images tend to be various symbols, colorful patterns, pictures of objects, etc. The provision of mechanisms by which such an image (e.g., the image 881) may be conveyed from within the secure enclave 367 to the display interface 385 ensures that it cannot be captured or tampered with by malicious software that may reside within the storage 360 outside of the secure enclaves 366 and 367. Were such malicious software able to capture a copy of the image 881, such malicious software may then attempt to present its own false version of a login screen for the server to which access is sought on the display 380 to induce the operator to provide a password, fingerprint scan, etc.

Figure 5:
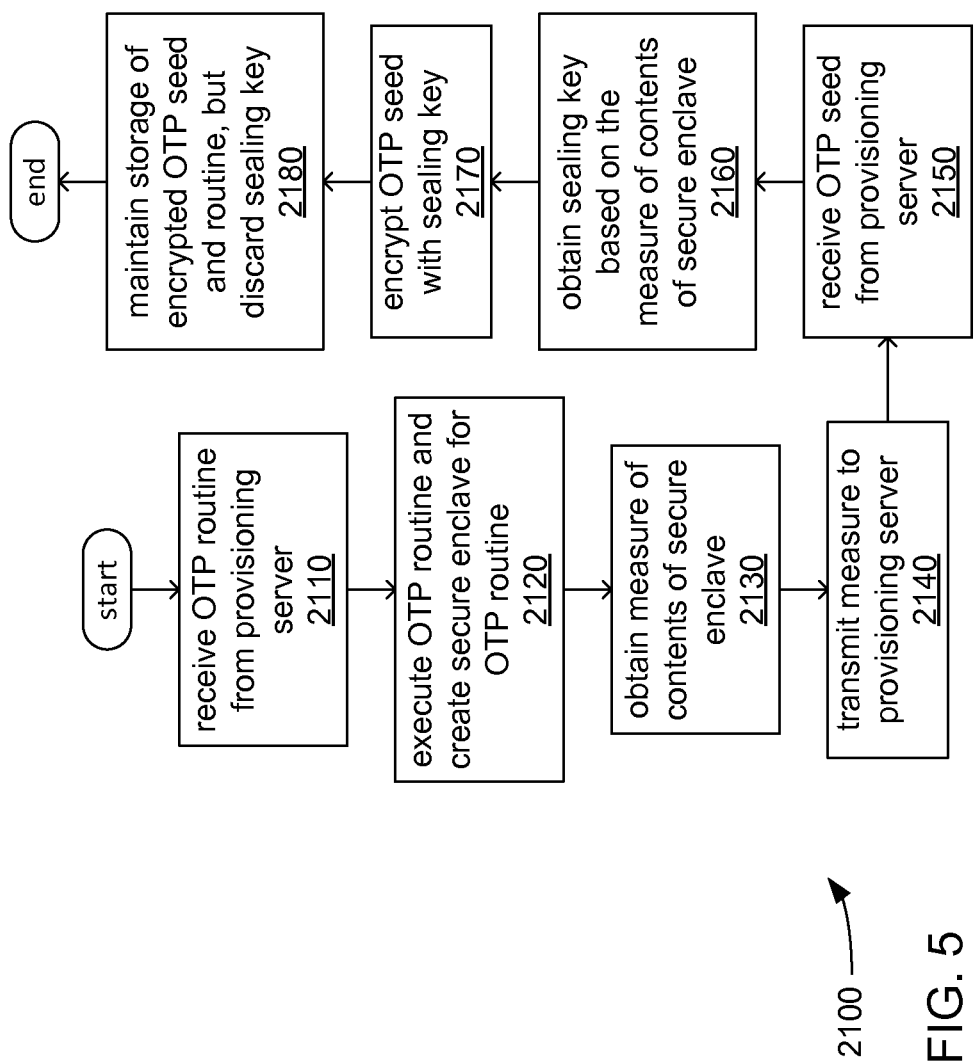
FIG. 5 illustrates an embodiment of a first logic flow.

FIG. 5 illustrates one embodiment of a logic flow 2100. The logic flow 2100 may be representative of some or all of the operations executed by one or more embodiments described herein. More specifically, the logic flow 2100 may illustrate operations performed by the processor element 350 in executing at least the control routines 340 and/or 370, and/or performed by other component(s) of the computing device 300.

At 2110, a computing device (e.g., the computing device 300) receives an OTP routine (e.g., the control routine 370, or at least the OTP component 375 thereof) from a provisioning server (e.g., the provisioning server 100). As has been discussed, the provisioning server may prompt an operator of the computing device to enter a passcode received by the operator "out-of-band" by an entirely different mechanism of communication, such as through a postal service, by phone or in person.

At 2120, a main processor element of the computing device (e.g., the processor element 350 of the computing device 300) executes the OTP routine, and that execution entails execution of instructions within the OTP routine calling for an instantiation of a secure enclave. The main processor element creates the secure enclave in response to those instructions, the OTP routine is stored therein, and further execution of the OTP routine occurs therein where greater security is able to be provided from a malicious piece of software that may reside elsewhere in the computing device.

At 2130, a measure of the contents of the secure enclave is obtained. As has been discussed, this may be done by requesting that a controller processor element of a controller within the computing device (e.g., the processor element 450 of the controller 400) derive the measure of the contents of the enclave. However, as has also been discussed, this may alternatively be done by the main processor element executing instructions within another secure enclave to derive the measure of the secure enclave in which the OTP routine is stored.

At 2140, the measure is transmitted to the provisioning server. At 2150, an OTP seed is received from the provisioning server and is stored within the secure enclave in which the OTP routine resides.

At 2160, a sealing key based on the earlier-taken measure of the contents of that secure enclave (i.e., prior to storing the OTP seed within the secure enclave) is obtained. Like the derivation of a measure, the sealing key may be created by a controller processor element within a controller or by the main processor element executing instructions stored within another secure enclave. As has been discussed, in creating the sealing key, an ID code of a component of the computing device (e.g., an ID code of the main processor element) may be used along with the new measure of the secure enclave in which the OTP routine and seed are stored.

At 2170, the sealing key is employed in encrypting the OTP seed. At 2180, the OTP routine and the newly encrypted OTP seed are maintained within storage of the computing device for later use in generating OTPs, but not the sealing key. The sealing key is discarded. As has been discussed, the OTP routine and OTP seed cease to be stored within the secure enclave as it is expected that the secure enclave will be uninstantiated once provisioning is complete.

Figure 6:
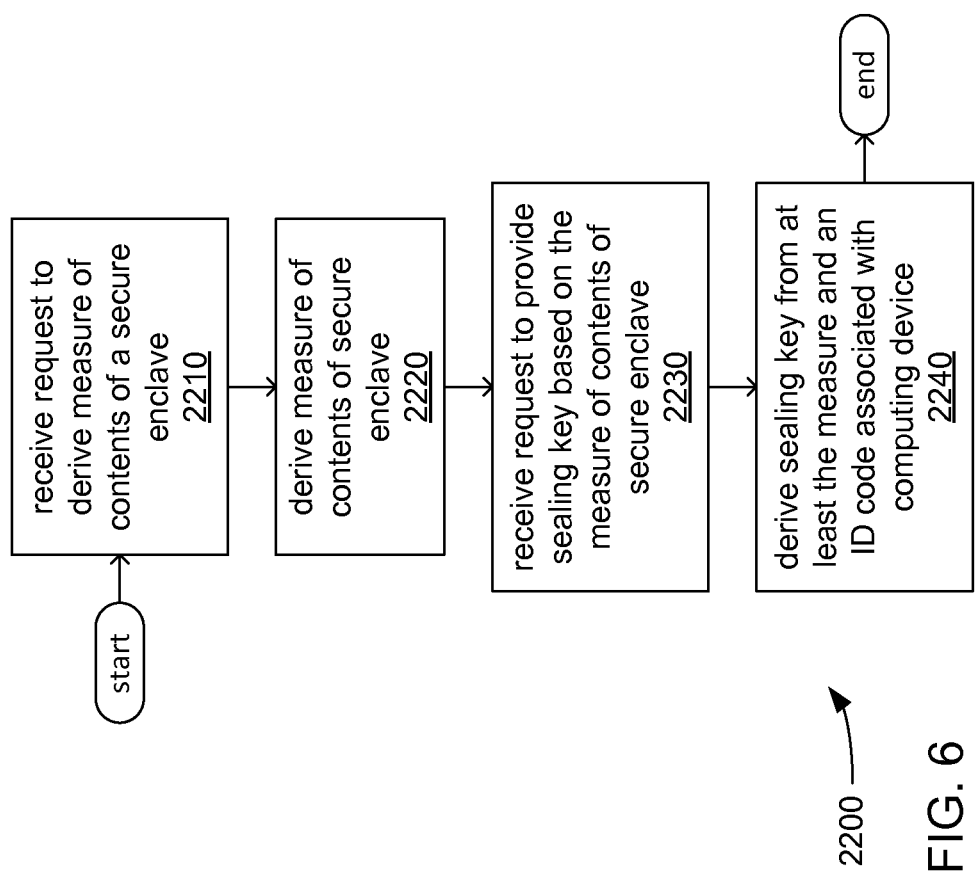
FIG. 6 illustrates an embodiment of a second logic flow.

FIG. 6 illustrates one embodiment of a logic flow 2200. The logic flow 2200 may be representative of some or all of the operations executed by one or more embodiments described herein. More specifically, the logic flow 2200 may illustrate operations performed by the processor element 450 in executing at least the control routine 440, and/or performed by other component(s) of the controller 400.

At 2210, a controller processor element of a computing device (e.g., the processor element 450 of the controller 400 of the computing device 300) receives a request from a main processor element of the computing device (e.g., the processor element 350) for a measure of the contents of a secure enclave instantiated within a storage of the computing device to enable secure execution of instructions stored therein by the main processor element (e.g., the secure enclave 367). At 2220, the controller processor element derives the measure of the contents of that secure enclave, and provides it to the main processor element.

At 2230, the controller processor element receives a request from the main processor element to provide a sealing key based at least on the earlier-taken measure of the contents of the secure enclave. At 2240, the controller processor element creates the sealing key from at least the earlier-taken measure, and possibly also from an ID code associated with a component or other aspect of the computing device.

Figure 7:
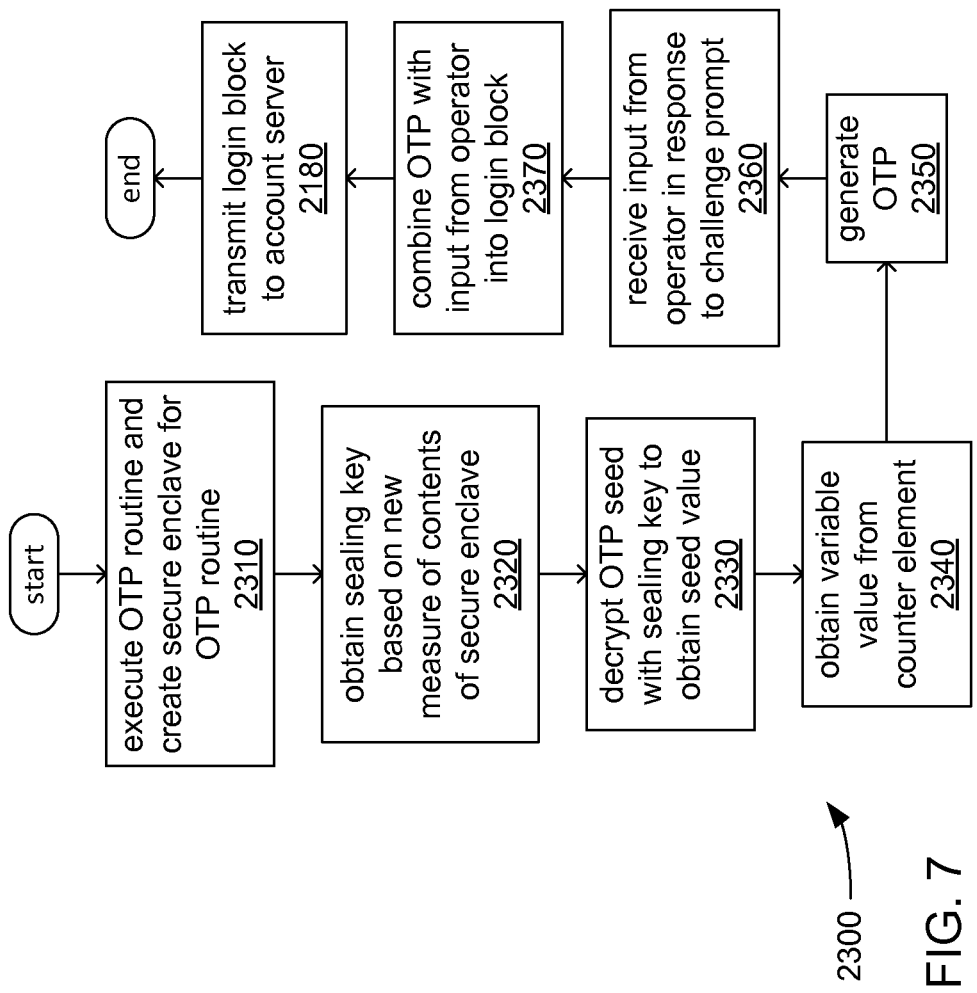
FIG. 7 illustrates an embodiment of a third logic flow.

FIG. 7 illustrates one embodiment of a logic flow 2300. The logic flow 2300 may be representative of some or all of the operations executed by one or more embodiments described herein. More specifically, the logic flow 2300 may illustrate operations performed by the processor element 350 in executing at least the control routines 340 and/or 370, and/or performed by other component(s) of the computing device 300.

At 2310, a main processor element of a computing device (e.g., the processor element 350 of a computing device 300) executes an OTP routine, and that execution entails execution of instructions within the OTP routine (e.g., the control routine 370, or at least the OTP component 375 thereof) calling for an instantiation of a secure enclave. The main processor element creates the secure enclave in response to those instructions, the OTP routine is stored therein, and further execution of the OTP routine occurs therein where greater security is able to be provided from a malicious piece of software that may reside elsewhere in the computing device. As has been discussed, it may be that an operator of the computing device operates the computing device to access an account server on which the operator has an account for the provision of various services (e.g., the account server 600), and it is this access to such an account server that triggers this execution of the OTP routine. As has also been discussed, such remote triggering to execute the OTP routine may be the result of the OTP routine being a "plug-in" or "extension" of a web browser stored within the computing device and operated by the operator to access the account server.

At 2320, a sealing key based on a new measure of the contents of that secure enclave (including the OTP routine, but not yet including the OTP seed) is created anew. On this occasion, the sealing key is actually being re-created based on a measure of the contents of the secure enclave being taken, also anew. This stems from the fact that following encryption of the OTP seed at the time of provisioning, the sealing key used for that encryption was discarded. Now that the OTP seed is to be used, the sealing key must once again be re-created. As has been discussed, the sealing key may be re-created by a controller processor element of a controller within the computing device (e.g., the processor element 450 of the controller 400) or by the main processor element executing instructions stored within another enclave to do so. As has also been discussed, in re-creating the sealing key, an ID code of a component of the computing device (e.g., an ID code of the main processor element) may be used along with the new measure of the secure enclave in which the OTP routine and seed are stored.

At 2330, the OTP seed is decrypted using the recreated sealing key to obtain the seed value therefrom. To do this, the OTP seed is stored within the secure enclave, following the taking of the new measure, to enable its decryption within the secure environment provided by the secure enclave. Successful decryption of the OTP seed presumes that the re-created sealing key just obtained is identical to the original sealing key created at the time of provisioning.

At 2340, a variable value is obtained from a counter element. As has been discussed, this may be done by requesting that a controller processor element within a controller provide the variable value from a hardware-based counter element within the controller. However, as has also been discussed, this may alternatively be done by the main processor element executing instructions within another secure enclave to derive produce the variable value.

At 2350, the main processor element executing the OTP routine uses the seed value and the variable value to generate an OTP. At 2360, input from an operator of the computing device operating controls of the computing device is received in response to a challenge prompt for the input received from the account server and presented on a display of the computing device.

At 2370, at least the input from the operator and the generated OTP are combined to form a login block. As has been discussed, still other pieces of information such as an ID code associated with at least a component of the computing device may also be included. At 2380, the login block is transmitted to the account server.

Figure 8:
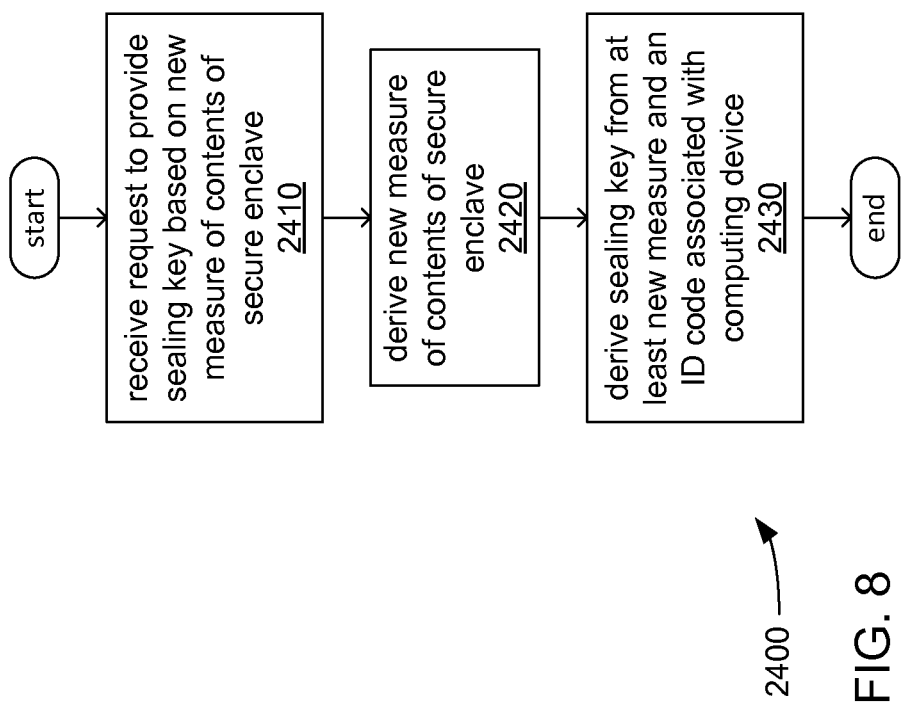
FIG. 8 illustrates an embodiment of a fourth logic flow.

FIG. 8 illustrates one embodiment of a logic flow 2400. The logic flow 2400 may be representative of some or all of the operations executed by one or more embodiments described herein. More specifically, the logic flow 2400 may illustrate operations performed by the processor element 450 in executing at least the control routine 440, and/or performed by other component(s) of the controller 400.

At 2410, a controller processor element of a computing device (e.g., the processor element 450 of the controller 400 of the computing device 300) receives a request from a main processor element of the computing device (e.g., the processor element 350) to provide a sealing key based at least on a new measure of the contents of the secure enclave. As has been discussed, such a new measure is requested as a result of an operator of the computing device seeking access to an account server such that an OTP must be generated.

At 2420, the controller processor derives a new measure of the contents of a secure enclave instantiated within a storage of the computing device to enable secure execution of instructions stored therein by the main processor element (e.g., the secure enclave 367). At 2430, the controller processor element creates the sealing key from at least the new measure, and possibly also from an ID code associated with a component or other aspect of the computing device.

Figure 9:
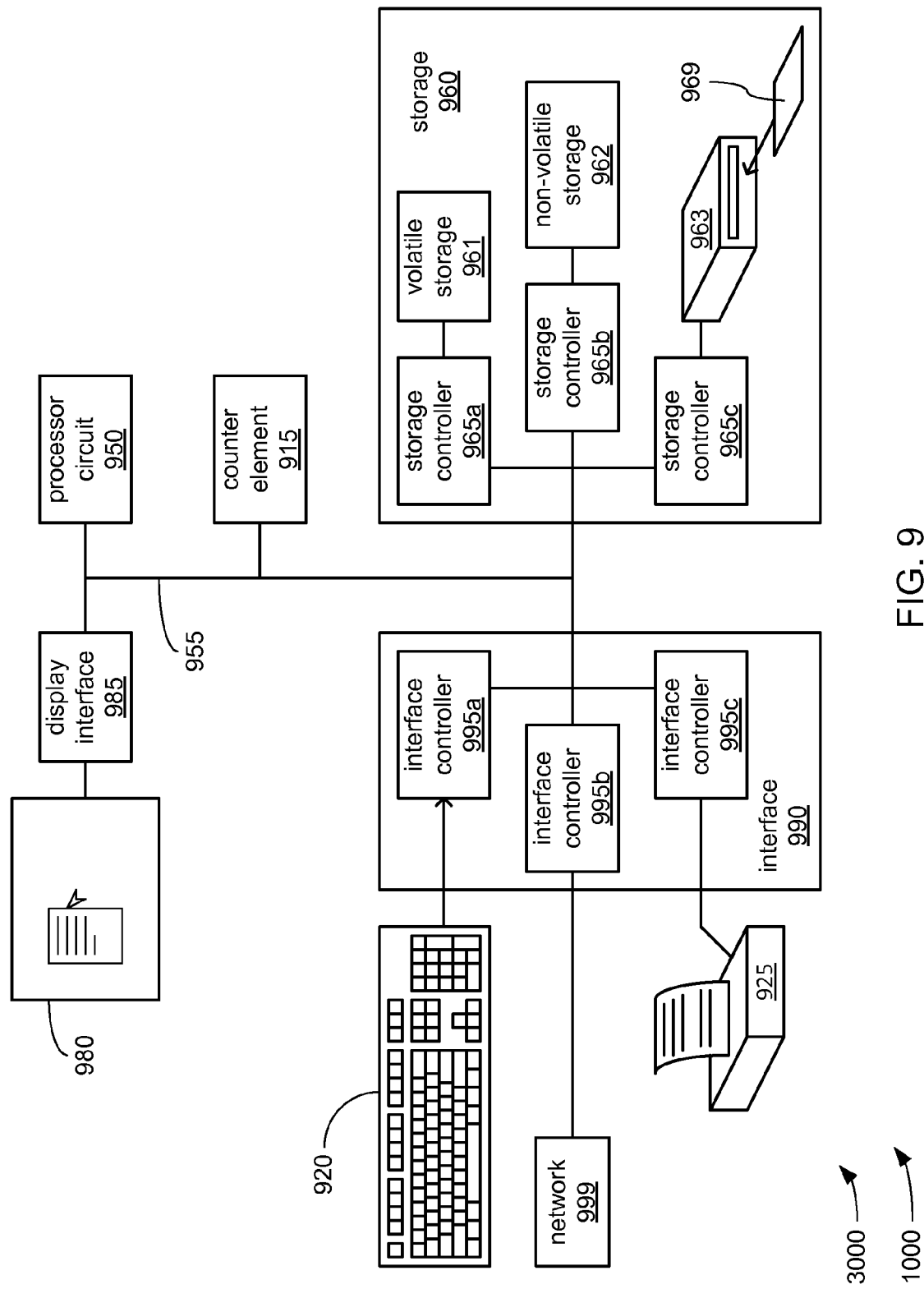
FIG. 9 illustrates an embodiment of a processing architecture.

FIG. 9 illustrates an embodiment of an exemplary processing architecture 3000 suitable for implementing various embodiments as previously described. More specifically, the processing architecture 3000 (or variants thereof) may be implemented as part of one or more of the computing devices 100, 300 and 600. It should be noted that components of the processing architecture 3000 are given reference numbers in which the last two digits correspond to the last two digits of reference numbers of components earlier depicted and described as part of each of these computing devices. This is done as an aid to correlating such components of whichever ones of these computing devices may employ this exemplary processing architecture in various embodiments.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3000, a computing device incorporates at least a processor element 950, a storage 960, an interface 990 to other devices, and a coupling 955. Depending on various aspects of a computing device implementing the processing architecture 3000, including its intended use and/or conditions of use, such a computing device may further incorporate additional components, such as without limitation, a counter element 915.

The coupling 955 incorporates one or more buses, point-to-point interconnects, transceivers, buffers, crosspoint switches, and/or other conductors and/or logic that communicatively couples at least the processor element 950 to the storage 960. The coupling 955 may further couple the processor element 950 to one or more of the interface 990 and the display interface 985 (depending on which of these and/or other components are also present). With the processor element 950 being so coupled by couplings 955, the processor element 950 is able to perform the various ones of the tasks described at length, above, for whichever ones of the computing devices 100, 300 and 600 implement the processing architecture 3000. The coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCM-CIA) bus, HyperTransport™, QuickPath, and the like.

As previously discussed, the processor element 950 (corresponding to one or more of the processor elements 150, 350, 450 and 650) may include any of a wide variety of commercially available processors, employing any of a wide variety of technologies and implemented with one or more cores physically combined in any of a number of ways.

As previously discussed, the storage 960 (corresponding to one or more of the storages 160, 360, 460 and 660) may include one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor element 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of removable machine-readable storage media 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage media 969.

One or the other of the volatile storage 961 or the non-volatile storage 962 may include an article of manufacture in the form of a machine-readable storage media on which a routine comprising a sequence of instructions executable by the processor element 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 950 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor element 950 as that routine is executed.

As previously discussed, the interface 990 (corresponding to one or more of the interfaces 190 and 690, as well as an interface incorporating the interface controllers 395a and 395b) may employ any of a variety of signaling technologies corresponding to any of a variety of communications technologies that may be employed to communicatively couple a computing device to one or more other devices. Again, one or both of various forms of wired or wireless signaling may be employed to enable the processor element 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also incorporate the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices 100, 300 and 600 may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus to provide secure access includes a computer-readable storage; a first processor element coupled to the computer-readable storage; and first logic to receive a one-time password (OTP) routine, store the OTP routine within a first secure enclave defined by the first processor element within the storage, obtain a measure of the contents of the first secure enclave with the OTP routine stored therein, transmit the measure to a computing device, and receive an OTP seed.

The above example of an apparatus in which the first logic is to execute instructions of the OTP routine, and the instructions are to cause the first processor element to define the first secure enclave.

Either of the above examples of an apparatus in which the first logic is to execute instructions of a measuring component stored within a second secure enclave defined by the first processor element within the storage, and the instructions are to cause the first processor element to derive the measure.

Any of the above examples of an apparatus in which the apparatus includes a controller, and the first logic is to signal the controller to provide the measure.

Any of the above examples of an apparatus in which the first logic is to store the OTP seed within the first secure enclave.

Any of the above examples of an apparatus in which the first logic is to use a sealing key created from at least the measure to encrypt the OTP seed following storage of the OTP seed within the secure enclave.

Any of the above examples of an apparatus in which the sealing key created from at least the measure and an identification code of the first processor element.

Any of the above examples of an apparatus in which the first logic is to execute first instructions of a measuring component stored within a second secure enclave defined by the first processor element within the storage, the first instructions to cause the first processor element to derive the measure prior to storage of the OTP seed in the first secure enclave, and execute second instructions of a key generator stored within the second secure enclave, the second instructions to cause the first processor element to create the sealing key.

Any of the above examples of an apparatus in which the apparatus includes a controller, and the first logic is to signal the controller to provide the sealing key.

Any of the above examples of an apparatus in which the controller includes a second processor element and second logic to generate the sealing key.

Any of the above examples of an apparatus in which the apparatus includes a display and a manually-operable control; and the first logic is to visually present a prompt to provide a passcode, receive signals that indicate operation of the manually-operable control to provide the passcode, and transmit the passcode to the computing device.

An example of another apparatus to provide secure access includes a computer-readable storage; a first processor element coupled to the computer-readable storage; and first logic to, store an OTP seed and an OTP routine within a first secure enclave defined by the first processor element within the storage, obtain a sealing key from at least a measure of the contents of the first secure enclave with the OTP seed and OTP routine stored therein, use the sealing key to decrypt the OTP seed to obtain a seed value, obtain a variable value from a counter element, generate an OTP, and transmit the OTP to a computing device.

The above example of another apparatus in which the first logic is to execute instructions of the OTP routine, and the instructions are to cause the first processor element to define the first secure enclave.

Either of the above examples of another apparatus in which the apparatus includes a manually-operable control, and the first logic is to receive signals that indicate operation of the manually-operable control to provide an input and transmit the input to the computing device.

Any of the above examples of another apparatus in which the manually-operable control includes one of a keyboard and a fingerprint reader, and the input includes one of a password and a fingerprint.

Any of the above examples of another apparatus in which the logic is to execute first instructions of a measuring component stored within a second secure enclave defined by the first processor element within the storage where the first instructions are to cause the first processor element to derive the measure; and execute second instructions of a key generator stored within the second secure enclave where the second instructions are to cause the first processor element to create the sealing key from at least the measure.

Any of the above examples of another apparatus in which the apparatus includes a controller and the first logic is to signal the controller to provide the sealing key.

Any of the above examples of another apparatus in which the controller includes a second processor element and second logic to generate the sealing key.

Any of the above examples of another apparatus in which the sealing key created from at least the measure and an identification code of the first processor element.

An example of a computer-implemented method of providing secure access includes receiving a one-time password (OTP) routine, storing the OTP routine within a first secure enclave defined by a first processor element within a storage, obtaining a first measure of the contents of the first secure enclave with the OTP routine stored therein, transmitting the first measure to a computing device, and receiving an OTP seed.

The above example of a computer-implemented method in which the method includes executing instructions of the OTP routine to cause the first processor element to define the first secure enclave.

Either of the above examples of a computer-implemented method in which the method includes executing instructions of a measuring component stored within a second secure enclave defined by the first processor element within the storage to cause the first processor element to derive the first measure.

Any of the above examples of a computer-implemented method in which the method includes signaling a second processor element to provide the first measure.

Any of the above examples of a computer-implemented method in which the method includes obtaining a first sealing key from at least the first measure of the contents of the first secure enclave with the OTP routine stored therein and prior to storing the OTP seed therein, storing the OTP seed within the first secure enclave, using the first sealing key to encrypt the OTP seed following storing the OTP seed in the first secure enclave, discarding the first sealing key, and uninstantiating the first secure enclave.

Any of the above examples of a computer-implemented method in which the method includes executing first instructions of a measuring component stored within a second secure enclave defined by the first processor element within the storage where the first instructions are to cause the first processor element to derive the first measure prior to storage of the OTP seed in the first secure enclave, and executing second instructions of a key generator stored within the second secure enclave where the second instructions are to cause the first processor element to create the first sealing key from at least the first measure.

Any of the above examples of a computer-implemented method in which the method includes signaling a second processor element to provide the first sealing key.

Any of the above examples of a computer-implemented method in which the method includes storing an OTP routine within a second secure enclave defined by the first processor element within the storage, obtaining a second sealing key from at least a second measure obtained of the contents of the second secure enclave with the OTP routine stored therein and the OTP seed not stored therein, storing the OTP seed within the second secure enclave, using the second sealing key to decrypt the OTP seed to obtain a seed value following storing the OTP seed in the second secure enclave, obtaining a variable value from a counter element, generating an OTP, and transmitting the OTP.

Any of the above examples of a computer-implemented method in which the method includes creating the second sealing key from at least the second measure and an identification code of the first processor element.

An example of an apparatus to provide secure access includes means for performing any of the above examples of a computer-implemented method.

An example of at least one machine-readable storage medium includes instructions that when executed by a computing device, cause the computing device to receive a one-time password (OTP) routine, store the OTP routine within a first secure enclave defined by a first processor element of the computing device within a storage of the computing device, obtain a first measure of the contents of the first secure enclave with the OTP routine stored therein, transmit the first measure to a provisioning server, and receive an OTP seed.

The above example of at least one machine-readable storage medium in which the computing device is caused to execute instructions of the OTP routine to cause the first processor element to define the first secure enclave.

Either of the above examples of at least one machine-readable storage medium in which the computing device is caused to execute instructions of a measuring component stored within a second secure enclave defined by the first processor element within the storage to cause the first processor element to derive the first measure.

Any of the above examples of at least one machine-readable storage medium in which the computing device is caused to signal a second processor element of the computing device to provide the first measure.

Any of the above examples of at least one machine-readable storage medium in which the computing device is caused to obtain a first sealing key from at least the first measure of the contents of the first secure enclave with the OTP routine stored therein and prior to storage of the OTP seed therein, store the OTP seed within the first secure enclave, use the first sealing key to encrypt the OTP seed following storage of the OTP seed in the first secure enclave, discard the first sealing key, and uninstantiate the first secure enclave.

Any of the above examples of at least one machine-readable storage medium in which the computing device is caused to execute first instructions of a measuring component stored within a second secure enclave defined by the first processor element within the storage where the first instructions are to cause the first processor element to derive the first measure prior to storage of the OTP seed in the first secure enclave, and execute second instructions of a key generator stored within the second secure enclave where the second instructions are to cause the first processor element to create the first sealing key from at least the first measure.

Any of the above examples of at least one machine-readable storage medium in which the computing device is caused to signal a second processor element to provide the first sealing key.

Any of the above examples of at least one machine-readable storage medium in which the computing device is caused to store the OTP routine within a second secure enclave defined by the first processor element within the storage, obtain a second sealing key from at least a second measure obtained of the contents of the second secure enclave with the OTP routine stored therein and the OTP seed not stored therein, store the OTP seed within the second secure enclave, use the second sealing key to decrypt the OTP seed to obtain a seed value following storing the OTP seed in the second secure enclave, obtain a variable value from a counter element, generate an OTP, and transmit the OTP.

Any of the above examples of at least one machine-readable storage medium in which the computing device is caused to create the second sealing key from at least the second measure and an identification code of the first processor element.

An example of still another apparatus to provide secure access includes means for receiving a one-time password (OTP) routine, storing the OTP routine within a first secure enclave defined by a first processor element of the computing device within a storage of the computing device, obtaining a first measure of the contents of the first secure enclave with the OTP routine stored therein, transmitting the first measure to a provisioning server, and receiving an OTP seed.

The above example of still another apparatus in which the apparatus includes means for executing instructions of the OTP routine to cause the first processor element to define the first secure enclave.

Either of the above examples of still another apparatus in which the apparatus includes means for executing instructions of a measuring component stored within a second secure enclave defined by the first processor element within the storage to cause the first processor element to derive the first measure.

Any of the above examples of still another apparatus in which the apparatus includes means for signaling a second processor element of the computing device to provide the first measure.

Any of the above examples of still another apparatus in which the apparatus includes means for obtaining a first sealing key from at least the first measure of the contents of the first secure enclave with the OTP routine stored therein and prior to storage of the OTP seed therein, storing the OTP seed within the first secure enclave, using the first sealing key to encrypt the OTP seed following storage of the OTP seed in the first secure enclave, discarding the first sealing key, and uninstantiating the first secure enclave.

Any of the above examples of still another apparatus in which the apparatus includes means for executing first instructions of a measuring component stored within a second secure enclave defined by the first processor element within the storage, the first instructions to cause the first processor element to derive the first measure prior to storage of the OTP seed in the first secure enclave, and executing second instructions of a key generator stored within the second secure enclave, the second instructions to cause the first processor element to create the first sealing key from at least the first measure.

Any of the above examples of still another apparatus in which the apparatus includes means for signaling a second processor element to provide the first sealing key.

Any of the above examples of still another apparatus in which the apparatus includes means for storing the OTP routine within a second secure enclave defined by the first processor element within the storage, obtaining a second sealing key from at least a second measure obtained of the contents of the second secure enclave with the OTP routine stored therein and the OTP seed not stored therein, storing the OTP seed within the second secure enclave, using the second sealing key to decrypt the OTP seed to obtain a seed value following storing the OTP seed in the second secure enclave, obtaining a variable value from a counter element, generating an OTP, and transmitting the OTP.

Any of the above examples of still another apparatus in which the apparatus includes means for creating the second sealing key from at least the second measure and an identification code of the first processor element.

The invention claimed is:

1. An apparatus comprising:
 a computer-readable storage device;
 a first processor element coupled to the storage device; and
 first logic to:
  receive a one-time password (OTP) routine;
  store the OTP routine within a first secure enclave defined by the first processor element within the storage device;
  obtain a first measure of the contents of the first secure enclave with the OTP routine stored therein;
  transmit the measure to a computing device;
  receive an OTP seed;
  generate a sealing key from at least the first measure;
  store the OTP seed within the first secure enclave;
  encrypt the OTP seed with the sealing key following storage of the OTP seed in the first secure enclave;
  discard the sealing key;
  uninstantiate the first secure enclave;
  instantiate a second secure enclave defined by the first processor element within the storage at a time following the uninstantiation of the first secure enclave and the discard of the sealing key;
  store the OTP routine within the second secure enclave;
  obtain a second measure of the contents of the second secure enclave with the OTP routine stored therein and with the OTP seed not stored therein;
  regenerate the sealing key from at least the second measure;
  store the OTP seed within the second secure enclave;
  decrypt the OTP seed with the sealing key to obtain a seed value; and
  generate an OTP with the OTP routine from the seed value.

2. The apparatus of claim 1, the sealing key generated from at least the first measure and an identification code of the first processor element.

3. The apparatus of claim 1, the first logic to:
 execute first instructions of a measuring component stored within a third secure enclave defined by the first processor element within the storage device, the first instructions to cause the first processor element to derive the first measure prior to storage of the OTP seed in the first secure enclave; and
 execute second instructions of a key generator stored within the third secure enclave, the second instructions to cause the first processor element to generate the sealing key from at least the first measure.

4. The apparatus of claim 1, comprising a controller, the controller comprising a second processor element and the first logic to signal the controller to generate the sealing key.

5. The apparatus of claim 1, comprising a display and a manually-operable control, the first logic to:
 visually present a prompt to provide a passcode on the display;
 receive signals that indicate operation of the manually-operable control to provide the passcode; and
 transmit the passcode to the computing device.

6. A computer-implemented method comprising:
 receiving a one-time password (OTP) routine;
 storing the OTP routine within a first secure enclave defined by a first processor element within a storage;
 obtaining a first measure of the contents of the first secure enclave with the OTP routine stored therein;
 transmitting the first measure to a computing device;
 receiving an OTP seed;
 generating a sealing key from at least the first measure;
 storing the OTP seed within the first secure enclave;
 encrypting the OTP seed with the sealing key following storing the OTP seed in the first secure enclave;
 discarding the sealing key;
 uninstantiating the first secure enclave;
 instantiating a second secure enclave defined by the first processor element within the storage at a time following the uninstantiating of the first secure enclave and the discarding of the sealing key;
 storing the OTP routine within the second secure enclave;
 obtaining a second measure of the contents of the second secure enclave with the OTP routine stored therein and with the OTP seed not stored therein;
 regenerating the sealing key from at least the second measure;
 storing the OTP seed within the second secure enclave;
 decrypting the OTP seed with the sealing key to obtain a seed value; and
 generating an OTP with the OTP routine from the seed value.

7. The computer-implemented method of claim 6, comprising executing instructions of the OTP routine to cause the first processor element to define the first secure enclave.

8. The computer-implemented method of claim 6, comprising signaling a second processor element to provide the first measure.

9. The computer-implemented method of claim 6, comprising:
 executing first instructions of a measuring component stored within a third secure enclave defined by the first processor element within the storage, the first instructions to cause the first processor element to derive the first measure prior to storage of the OTP seed in the first secure enclave; and
 executing second instructions of a key generator stored within the third secure enclave, the second instructions to cause the first processor element to generate the first sealing key from at least the first measure.

10. The computer-implemented method of claim 6, comprising:
 obtaining a variable value from a counter element;
 generating the OTP from the seed value and the variable; and
 transmitting the OTP.

11. The computer-implemented method of claim 6, comprising regenerating the sealing key from at least the second measure and an identification code of the first processor element.

12. At least one non-transitory machine-readable storage medium comprising instructions that when executed by a computing device, cause the computing device to:
 receive a one-time password (OTP) routine;
 store the OTP routine within a first secure enclave defined by a first processor element of the computing device within a storage of the computing device;
 obtain a first measure of the contents of the first secure enclave with the OTP routine stored therein;
 transmit the first measure to a provisioning server;
 receive an OTP seed;
 generate a sealing key from at least the first measure;
 store the OTP seed within the first secure enclave;
 encrypt the OTP seed with the sealing key following storage of the OTP seed in the first secure enclave;
 discard the sealing key;
 uninstantiate the first secure enclave;

instantiate a second secure enclave defined by the first processor element within the storage at a time following the uninstantiation of the first secure enclave and the discard of the sealing key;
store the OTP routine within the second secure enclave;
obtain a second measure of the contents of the second secure enclave with the OTP routine stored therein and with the OTP seed not stored therein;
regenerate the sealing key from at least the second measure;
store the OTP seed within the second secure enclave;
decrypt the OTP seed with the sealing key to obtain a seed value; and
generate an OTP with the OTP routine from the seed value.

13. The at least one machine-readable storage medium of claim 12, the computing device caused to:
execute first instructions of a measuring component stored within a third secure enclave defined by the first processor element within the storage, the first instructions to cause the first processor element to derive the first measure prior to storage of the OTP seed in the first secure enclave; and
execute second instructions of a key generator stored within the third secure enclave, the second instructions to cause the first processor element to generate the first sealing key from at least the first measure.

14. The at least one machine-readable storage medium of claim 12, the computing device caused to signal a second processor element to generate the sealing key.

15. The at least one machine-readable storage medium of claim 12, the computing device caused to:
obtain a variable value from a counter element;
generate the OTP from the seed value and the variable; and
transmit the OTP.

16. The at least one machine-readable storage medium of claim 15, the computing device caused to regenerate the sealing key from at least the second measure and an identification code of the first processor element.

17. The apparatus of claim 5, comprising:
an interface to couple the first processor element to a network; and
a controller comprising the first processor element and coupling the interface to the manually-operable control, the first logic to:
define a secure pathway through the controller to convey the passcode from the manually-operable control that cannot be accessed by a routine stored within the storage device at a location not within the first secure enclave; and
convey the passcode from the manually-operable control to the interface via the secure pathway to enable transmission of the passcode by the interface on the network to the computing device without interference from the routine.

18. The apparatus of claim 1, comprising:
an interface to couple the first processor element to the network; and
a counter element, the first logic to:
obtain a variable value from the counter element;
generate the OTP from the seed value and the variable; and
transmit the OTP.

19. The computer-implemented method of claim 6, comprising:
visually presenting a prompt to provide a passcode on a display;
receiving signals that indicate operation of a manually-operable control to provide the passcode; and
transmitting the passcode to the computing device.

20. The at least one machine-readable storage medium of claim 12, the computing device caused to:
visually present a prompt to provide a passcode on a display;
receive signals that indicate operation of a manually-operable control to provide the passcode; and
transmit the passcode to the computing device.

* * * * *